US011493631B2

(12) United States Patent
Girotti (10) Patent No.: US 11,493,631 B2
(45) Date of Patent: Nov. 8, 2022

(54) SAFETY SYSTEM INCLUDING A PLURALITY OF SCANNING LASERS AND A METHOD FOR MANAGING A PLURALITY OF SCANNING LASERS

(71) Applicant: Lorenzo Girotti, Bologna (IT)

(72) Inventor: Lorenzo Girotti, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 502 days.

(21) Appl. No.: 16/473,540

(22) PCT Filed: Dec. 27, 2017

(86) PCT No.: PCT/IB2017/058418
§ 371 (c)(1),
(2) Date: Jun. 25, 2019

(87) PCT Pub. No.: WO2018/122731
PCT Pub. Date: Jul. 5, 2018

(65) Prior Publication Data
US 2019/0369252 A1    Dec. 5, 2019

(30) Foreign Application Priority Data
Dec. 30, 2016    (IT) .................. 102016000132849

(51) Int. Cl.
*G01S 17/42*    (2006.01)
*G01S 7/00*    (2006.01)
(Continued)

(52) U.S. Cl.
CPC .............. *G01S 17/42* (2013.01); *G01S 7/003* (2013.01); *G01S 7/4817* (2013.01); *G01S 7/484* (2013.01); *G01S 7/486* (2013.01)

(58) Field of Classification Search
CPC ........ G01S 17/42; G01S 7/003; G01S 7/4817; G01S 7/484; G01S 7/486; G01S 17/87
See application file for complete search history.

(56) References Cited

U.S. PATENT DOCUMENTS 3,311,803 A    3/1967  Schulz
7,369,902 B2   5/2008  Nakayama et al.
(Continued)

FOREIGN PATENT DOCUMENTS

DE    19741730 B4    4/1999
DE    198 15 149 A1   10/1999
(Continued)

OTHER PUBLICATIONS

Int'l Search Report from PCT/IB2017/058418, dated Apr. 3, 2018, 3 pages.
(Continued)

*Primary Examiner* — Jennifer D Bennett
(74) *Attorney, Agent, or Firm* — The Juhasz Law Firm (57) ABSTRACT

A safety system, including a plurality of scanning lasers, with a master scanning laser and at least one slave scanning laser. The master scanning laser includes a first laser system adapted to emit a laser beam and a first optical system adapted to scan said laser beam within a field of view, the optical system driven by a first motor. The slave scanning laser includes a second laser system adapted to emit a laser beam and a second optical system adapted to scan said laser beam within a field of view, the optical system driven by a second motor. The master scanning laser and the slave scanning laser are connected to each other via a communication network adapted to support a network protocol wherein messages are sent according to said network pro-
(Continued)

tocol, including a synchronization message for clock synchronization of said master scanning laser and said slave scanning laser.

20 Claims, 6 Drawing Sheets

(51) Int. Cl.
    *G01S 7/481*     (2006.01)
    *G01S 7/484*     (2006.01)
    *G01S 7/486*     (2020.01)

(56) References Cited

U.S. PATENT DOCUMENTS

| | | |
|---|---|---|
| 7,511,615 B2 | 3/2009 | Shabar |
| 8,233,040 B2 | 7/2012 | Patel et al. |
| 8,280,099 B2 | 10/2012 | Harrison et al. |
| 8,572,305 B2 | 10/2013 | Weddington et al. |
| 8,648,292 B2 | 2/2014 | Kawabata et al. |
| 8,724,096 B2 | 5/2014 | Gosch et al. |
| 10,436,904 B2 | 10/2019 | Moss et al. |
| 2009/0222107 A1 | 9/2009 | Moddemann et al. |
| 2011/0051170 A1* | 3/2011 | Mongeon ............ G03G 15/161 358/1.14 |
| 2011/0170534 A1 | 7/2011 | York |
| 2014/0100675 A1 | 4/2014 | Dold |
| 2014/0101486 A1 | 4/2014 | Henneberger et al. |
| 2014/0240688 A1 | 8/2014 | Fritsch |
| 2015/0241562 A1 | 8/2015 | Goldberg et al. |
| 2019/0154439 A1* | 5/2019 | Binder .................... G01S 15/08 |

FOREIGN PATENT DOCUMENTS

| | | | |
|---|---|---|---|
| DE | 19815149 A1 * | 10/1999 | ............ G01S 17/87 |
| DE | 19815149 A1 | 10/1999 | |
| DE | 10 2016 103 302 A1 | 10/2016 | |
| EP | 1622039 A1 | 2/2006 | |
| EP | 2126781 B1 | 5/2010 | |

OTHER PUBLICATIONS

Written Opinon and Search Report from PCT/IB2017/058418, dated Apr. 3, 2018, 11 pages.
Int'l Prelim Report on Patentability (IPRP) from PCT/IB2017/058418, dated Jul. 11, 2019, 8 pages.
German Patent Office, Office Action received in counterpart German application, dated May 13, 2022, 66 pages.
WIPO Description of DE 198 15 149 since English translation of the reference unavailable, Oct. 7, 1999.
Google translation of Abstract of DE 198 15 149 since English translation of the reference unavailable, Oct. 7, 1999.
Statement that U.S. Pat. No. 10,436,904 identified in this IDS appears to be the US counterpart to the foregoing German reference written in the German language, Oct. 8, 2019.
SICK Sensor Intelligence, LMS400 Laser Measurement Sensors, Product Manual, Feb. 4, 2016.

\* cited by examiner

SAFETY SYSTEM INCLUDING A PLURALITY OF SCANNING LASERS AND A METHOD FOR MANAGING A PLURALITY OF SCANNING LASERS

CLAIM TO PRIORITY

This application claims priority under the terms of 35 U.S.C. § 371(c) to PCT/IB2017/058418, filed on Dec. 27, 2017, which is hereby incorporated by reference in its entirety; PCT application PCT/IB2017/058418 claims priority to Italian Application 102016000132849, filed on Dec. 30, 2016, which is also incorporated by reference in its entirety.

BACKGROUND

Field

The present disclosure relates to a system in which more than one scanning laser, and preferably more than one safety scanning laser, is present. The disclosure further relates to a method for managing a plurality of such scanning laser.

Description

A scanning laser is commonly used to have protection of dangerous areas, or control over accesses or dangerous points in all fields of personal protection, in an effective and versatile manner.

Some types of scanning lasers are used to detect the movement or the intrusion of a foreign body in an area, such as an operating area of a machine, and can assure protection to an operator who works with the machine or other industrial equipment.

Safety scanning lasers generally operate according to the principle of diffuse reflection and of the time of flight of light. Electromagnetic radiation pulses, for example laser light, are reflected by a rotating mirror and emitted on a determined angular arc, forming a field of view of the scanning laser. If an object is present in the field of view of the scanning laser, the diffuse reflection of the electromagnetic radiation caused by an intrusion in the preconfigured field of view is detected and processed to determine the position and the distance of the object from the scanning lasers.

When laser light is emitted, an electronic chronometer is activated. The reflected light is then detected by the scanning lasers and processed to determine the distance of the object from the scanner, using the "time of flight" technique.

Therefore, a safety scanning laser is used to detect or not detect the presence of a more or less undesired object, within a certain field or spatial volume, and possibly also the size of that object. Different areas can be identified, at higher or lower risk, depending on whether they are closer or farther away from a machine or other equipment, and the presence of an object in one of these areas can cause the emission of an alarm of various types.

When it is necessary to conduct surveillance and assure safety with a scanning laser in a relatively large volume, or high accuracy is desired, for example requiring the determination of small objects, it is possible to use a plurality of scanning lasers that are controlled by a "master" scanning laser. However, the presence of a plurality of scanning lasers can create interference problems. It is possible that two distinct scanning lasers may both illuminate an object at the same instant in time and therefore that they both detect the presence of the object. The signal returning to the two scanning lasers is therefore erroneous because of the interference of the two laser signals sent.

Although this interference has a rather low probability of occurring, in precision scanning lasers it is nonetheless desired to prevent or at least minimise its occurrence as far as possible.

In the prior art, a known solution is, for example, to mount the scanning lasers, when more than one is necessary, in a determined configuration, or with determined angles or distances relative to each other. However, this limits freedom in the disposition of the devices.

In addition, the synchronization of the scanning lasers with a synchronization signal is known, in order to avoid the aforementioned interference. However, the synchronization signal requires an additional dedicated cable for communication between all scanning lasers, which makes the system as a whole costlier and more complicate.

Therefore, the purpose of the disclosure is to make available a system and a method in which a plurality of scanning lasers is managed, in particular safety scanning lasers, in which the effect of the interference between two scanning lasers of the system is markedly minimized.

SUMMARY

According to a first aspect, the disclosure relates to a safety system, including a plurality of scanning lasers, said plurality including a master scanning laser and at least one slave scanning laser, wherein said master scanning laser includes a first laser system adapted to emit a laser beam and a first optical system adapted to scan said laser beam within a field of view, said optical system being driven by a first motor. The slave scanning laser includes a second laser system adapted to emit a laser beam and a second optical system adapted to scan said laser beam within a field of view, said optical system being driven by a second motor; the master scanning laser and said slave scanning laser are connected to each other via a communication network; wherein said communication network is adapted to support a network protocol wherein messages are sent according to said network protocol, said network protocol including a synchronization message for the clock synchronization of said master scanning laser and said slave scanning laser. In addition, said master scanning laser includes a logic unit adapted to add a first additional datum to said synchronization message, said first additional datum being representative of a position of said motor at a given time.

The scanning lasers used in the system are known in the art and any type of scanning lasers, preferably safety scanning lasers, can be used.

Scanning lasers are generally but not exclusively used to protect work areas, for example around processing machinery.

A scanning laser preferably includes a laser system that emits a laser beam and an optical system that—starting from the generated laser beam, generates a "scan" thereof.

For example, the laser system can generate impulses at a very close distance. The impulses can, for example, be in the infrared spectrum. When these impulses meet an object, the reflected impulses are detected by the scanning laser. From the time elapsed between the transmission of the impulse and the reception of the reflected impulse, the distance of the object is calculated, for example the distance between the scanning laser and the object.

Based on the distance and on the direction of transmission of the impulses, the scanning laser determines the position of the object.

Furthermore, when the laser beam is generated, i.e. the plurality of impulses, the optical system deflects the laser beam, causing the impulses to cover an angular extension of a given angle that depends on the scanning laser in question. The optical system generally includes one or more rotating mirrors. The type of beam generated and the angular amplitude determine the field of view of the scanning laser. Therefore, the laser beam defines, in this scan thereof by the optical system, a plane.

Depending on the distance from the scanning laser, the field of view can be divided into multiple zones, of greater or lesser "dangerousness". I.e., the scanning lasers can be used for the safety of a machine or area and depending on the position of the object that is detected and on its distance from the machine, the "dangerousness" of such an object. If the object is at a distance below a given value, for example, it may be decided to stop the operation of the machinery or to operate safety gates, etc. If the distance is greater than the given value, but still below a pre-set threshold, a warning or alarm signal can be emitted, for example, and the operation of the machinery can still continue.

If a field of view of an individual scanning laser is not able to cover all the desired protection volume, a plurality of scanning lasers is preferably used.

Regardless of the detailed configuration of the optical system used to cause the generated laser beam to perform a scan of in the field of view, the optical system needs to be actuated, and the actuation is accomplished for example by means of a motor. The motor can for example set in motion one or more mirrors that are included in the optical system.

In the plurality of scanning lasers, a scanning laser is identified as the master scanning laser, and the remaining lasers are identified as slave scanning lasers. The master/slave dynamics are standard, the master scanning laser having unidirectional control in some processes of the slave scanning laser.

Master and slave scanning lasers are in mutual communication, to be able to exchange data relating to the measurements made, as well as status and functionality signals. The measurements pertain for example to the presence or absence of objects in their field of view and to their position. Communication between master scanning laser and slave scanning laser takes place through a communication network, and more preferably through an industrial communication network, according to a determined protocol.

Possible protocols usable for the communication described above are for example:
Profinet
EtherCat
Powerlink
Ethernet IP
Profibus
DeviceNet
CCLINK Preferably, the protocol used assures fast transmission of a considerable quantity of data.

The communication network between master scanning laser and slave scanning lasers is preferably an internal VLAN. Additionally, the master scanning laser is preferably in communication with a host or a PC outside the first network, i.e. is in communication with host/PC through preferably a second communication network, such as an external VLAN. Preferably, the data transmission protocol in the internal and external VLAN is different, because the protocol of the external VLAN is often established by the host, while the protocol of the internal VLAN is established by the manufacturer and/or by the user of scanning lasers.

In the network protocol used in the first network, or in the internal VLAN, a synchronization message is periodically sent. The synchronization message, "Sync", is sent by the master scanning laser to all slave scanning lasers present in the communication network whereby the slave scanning lasers are connected to the master scanning laser, i.e. for example to all scanning lasers connected to the internal VLAN. This synchronization message includes the "timestamp", i.e. the time (according to the master scanning laser) the message was transmitted.

This message containing the timestamp allows the synchronization of the internal clocks of master and slave scanning lasers. Considering the time T1 as the time of transmission of the Sync message by the master scanning laser to the slaves, each slave receives the message at a time T1' different from T1. Each slave preferably calculates such a time T1', which is the time offset of the slave relative to the master. Knowing the time of transit of the message, using standard techniques it is possible to synchronize the clocks of the slaves with that of the master.

The synchronization message is sent for example every 10 milliseconds by the master scanning laser to all slave scanning lasers simultaneously (multicast message).

In this synchronization message, which in detail depends on the type of protocol used within the first communication network for communication between the master scanning lasers and the slave scanning lasers, an additional datum is added according to the disclosure.

To carry out a correct synchronization of the master scanning laser with the slaves to avoid interference between the various laser beams, it is desired to know the position of the laser beam at all times. Therefore, the information of the position of the laser beam of the master in the moment when the message is sent is preferably inserted as an additional datum in the synchronization message that is periodically sent to all the slave scanning lasers by the master scanning laser. The position of the laser beam of the master scanning laser is determined by the motor in its optical system. Therefore, the additional datum that is inserted in the synchronization message is a datum that represents, or is correlated to, or is a function of, the position of the motor of the master scanning laser. This additional datum is preferably inserted in all synchronization messages periodically sent by the master scanning laser to the slave scanning lasers, together with the timestamp. The timestamp tells the instant in which the message was sent, therefore it tells the instant to which the position of the motor refers. For example, the datum can be about the phase of the motor.

The additional datum is inserted into the synchronization message by a logic unit, for example a microprocessor, of the master scanning laser.

Preferably, all optical systems are actuated at the same speed, for example at the same angular velocity, so that the master scanning lasers and the slave scanning lasers all have the same set speed, for example they all have the same pre-set speed of rotation. However, this speed can be modified. Preferably, a new value of the speed is the same for all devices to be synchronized, i.e. for all slave scanning lasers.

Knowing the position of the motor and hence of the laser beam of the master scanning laser, it is possible to synchronize the various slave scanning lasers.

For example, knowing the phase of the motor of the master scanning laser at the instant t0 and knowing that the N-th slave scanning lasers received the message at the instant t1, the phase of the motor (FM) of the master scanning laser at the instant t1 can be estimated through the operation $$FM(t1)=FM(t0)+\text{motor speed}*(t1-t0).$$

For each slave scanning laser, then, the desired phase of the motor (FDSN) of the optical system of the slave N at the instant t1 will be equal to FDSN(t1)=FM(t1)+DELTA_N where DELTA_N is a constant delay programmed at the beginning and which depends on the position of the slave N in physical space.

There is then preferably an adjustment of the phase of the motor of the slave scanning lasers, which will depend on the comparison between FDSN(t1) and FSN(t1) i.e. between the desired position of the slave N at the instant t1 and the real position of the slave N (FSN) at the same instant.

The phase offset that must be between each slave scanning laser and master scanning laser is pre-set before the system is turned on. The value of the phase offset is programmed and it may be modified.

According to the disclosure, then, through the network protocol and in particular through the synchronization message thereof, it is possible to inform all slave scanning lasers of the position of the motor of the master scanning laser so as to obtain a synchronization thereof, even in the absence of a dedicated cable, and compensating for the transmission delays that are in the network.

No dedicated message is created either, inasmuch as the synchronization message is anyway sent by the master scanning laser to all slave scanning lasers. Only an additional datum is added to an existing, periodically sent message.

Preferably, said scanning lasers are safety scanning lasers.

The master and slave scanning lasers are preferably scanning lasers able to assure safety in industrial environments. Hence, they are adapted to detect and measure the presence of objects in their field of view and to measure their distance from a desired point. Such safety scanning lasers are known in the art.

Preferably, said scanning lasers have a first and a second field of view that are substantially coplanar to each other.

The more dangerous situation with regard to interference is when two scanning lasers have the laser beam that travels through an angular trajectory in the same plane. "In the same plane" indicates that the plane defined by the scan of a first laser beam of a slave scanning laser and the plane defined by the scan of a second laser beam of a master scanning laser are "sufficiently close" to each other, co-planarity depending also on the distance from the scanning lasers. In this configuration of co-planarity of the fields of view, the danger of interference is high. However, this co-planarity configuration is preferred to obtain protection at 360° or otherwise at wide angle around a machine or other. In addition, this configuration is preferred if one wishes to obtain a map of "obstacles" present inside a plane.

Preferably, the system includes at least two slave scanning lasers. More preferably, the system includes three slave scanning lasers. The management of such a number of scanning lasers is generally sufficient for most of the applications required and/or to perform a 360° scan.

Preferably, said network protocol is an Ethernet network protocol.

The preferred protocol is an Ethernet protocol because of the considerable quantity of data that are generally sent in the transmission between the master and slave scanning lasers and the required speed of the transmission itself, inasmuch as it is decisive for safety. The quantity of data sent does not depend on the synchronization message, but rather by the transmission of the messages relating to the measurements made (detected objects, distance and angular position of the detected obstacles, reflectivity of the detected objects, diagnostic messages, etc.) between slave and master scanning lasers.

Preferably, said logic unit is adapted to add a second additional datum to a message of said network protocol, said second additional datum being representative of a speed of said first motor.

Preferably, the speed of the motors, or preferably the speed of rotation of the motors of the optical systems of the master and of the slaves, is the same. However, it is possible to modify this speed and therefore in this case the new speed datum is also sent by means of a message in the protocol.

Preferably, said slave scanning laser includes a second logic unit adapted to vary the speed of said second motor according to said first additional datum.

The second logic unit is preferably a microprocessor. Given the value of the phase of the motor of the master, the speed of the motor of the slave is varied so as to obtain the desired offset with respect to the master. Therefore, the feedback loop of the speed leads to a correction of the movement of the motor of the slave.

Preferably, said master scanning laser and said slave scanning lasers are connected through a communication interface including a cable.

Preferably the physical means for data transmission remain the one via cable for the quantity of data transmitted and for the required speed.

Preferably, said master scanning laser is connected through said communication network to said slave scanning laser through a switch.

In the communication network, a switch is a network device that acts on the addressing and on the routing within the network itself by means of a physical address. Therefore it "directs" the messages received towards the correct slave scanning laser (reading the destination MAC). Routing takes place by means of a univocal port-address correspondence.

More preferably, such a switch is an Ethernet switch.

Preferably, said slave scanning laser includes a second and a third logic unit, said synchronization message being sent by said master scanning laser to said first, second and said third logic units.

To obtain a "second fault" safety, each slave scanning laser includes two logic units, for example a first and a second microcontroller or microprocessor. The synchronization message through the network is sent to both microprocessors by the master scanning laser.

According to a second aspect, the disclosure relates to a method for managing a plurality of scanning lasers, said plurality including at least one master scanning laser and at least one slave scanning laser, wherein said master scanning laser includes a first laser system adapted to emit a laser beam and a first optical system adapted to scan said laser beam within a field of view, said optical system being driven by a first motor;

said slave scanning laser includes a second laser system adapted to emit a laser beam and a second optical system adapted to scan said laser beam within a field of view, said optical system being driven by a second motor;

said master scanning laser and said slave scanning laser being connected to each other via a communication network;

said communication network being adapted to support a network protocol wherein messages are sent according to said network protocol; and said method including:

sending a synchronization message by said master scanning laser to said slave scanning laser according to said network protocol to synchronize clocks of said master scanning laser and of said slave scanning laser; and before sending said synchronization message, adding to said synchronization message according to said network protocol a first additional datum about the position of said first motor at a given time.

The advantages of this second aspect have already been described in relation to the first aspect and are not repeated herein.

Preferably, adding said first additional datum includes adding said first additional datum to all of the synchronization signals according to said network protocol.

The additional datum relating to the position of the motor of the master scanning laser is preferably periodically sent using all synchronization messages according to the selected protocol to the slave scanning laser.

Preferably, said plurality includes at least two slave scanning lasers, and the method includes sending a "polling" signal by said master scanning laser to said at least two slave scanning lasers according to said network protocol for sending data relating to the presence of objects within said field of view of said at least two slave scanning lasers.

To check the status of the various slave scanning lasers, the master scanning laser at regular intervals sends a request (it carries out "polling") to each slave scanning lasers to communicate any measurements made (presence or absence of objects in their field of view, distance from any object), as well as the status, the diagnostics, information about clock synchronization, etcetera. At regular intervals, the master's request therefore asks each slave whether there is something to communicate and whether thus they want to use a communication line of the communication network. Both the polling and the reply messages are messages according to the protocol used in the network.

Preferably the method comprises changing a position of said second motor with respect to that of the first motor based on said first additional datum.

Preferably the method comprises changing a speed of said second motor based on said first additional datum such that also a relative position in time of said second motor with respect to said first motor is changed.

A feedback loop for controlling the relative position of the slave-master motor and a feedback loop of the speed of the motor of the slave are present.

BRIEF DESCRIPTION OF THE DRAWINGS

These and additional advantages of the disclosure will be more readily apparently from a detailed description thereof with reference to the accompanying drawings, in which.

DETAILED DESCRIPTION

Figure 3:
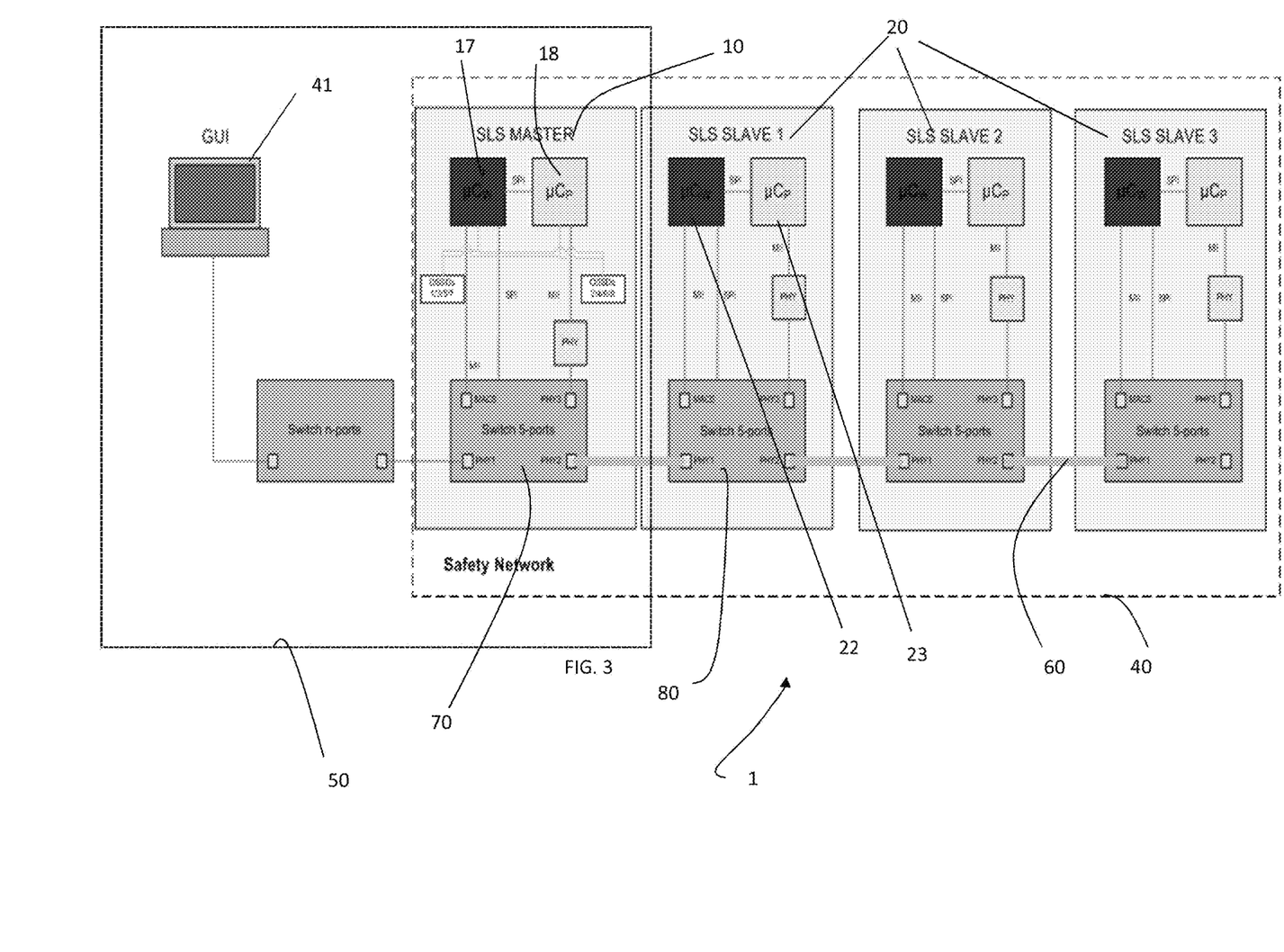
FIG. 3 is a schematic view of a plurality of master and slave scanning lasers connected with a communication network according to the disclosure.
Figure 6:
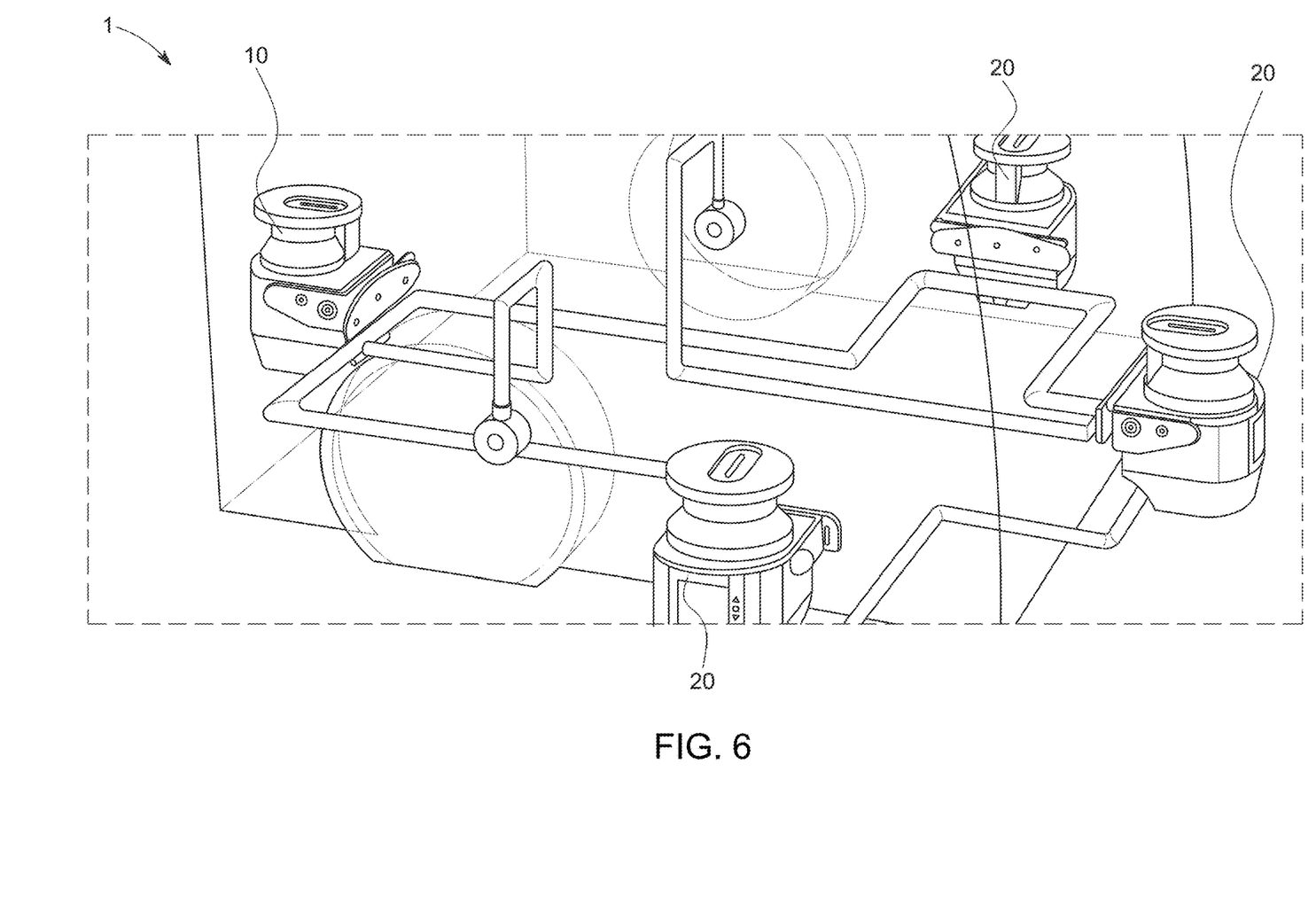
FIG. 6 is a perspective view of a plurality of master/slave scanning lasers according to the disclosure.

With initial reference to FIGS. 3 and 6, a safety system including scanning lasers realised according to the disclosure is globally indicated with the numeral 1.

The safety system 1 is adapted to identify any object or person in a certain area or volume around a device 30, for example a mobile device, thus assuring safety in its motion or for the persons near its area.

In the present disclosure, a scanning laser according to the present disclosure is globally indicated with the numeral 10 if it is a master scanning laser and with the numeral 20 if it is a slave scanning laser. In the example shown, four scanning lasers, a master scanning laser 10 and three slave scanning lasers 20 are present in the system 1, however a different number of slave scanning lasers can be present.

The safety system 1 according to the disclosure can be used in any operating field in which the use of safety systems with scanning lasers is known.

Figures 1, 4:
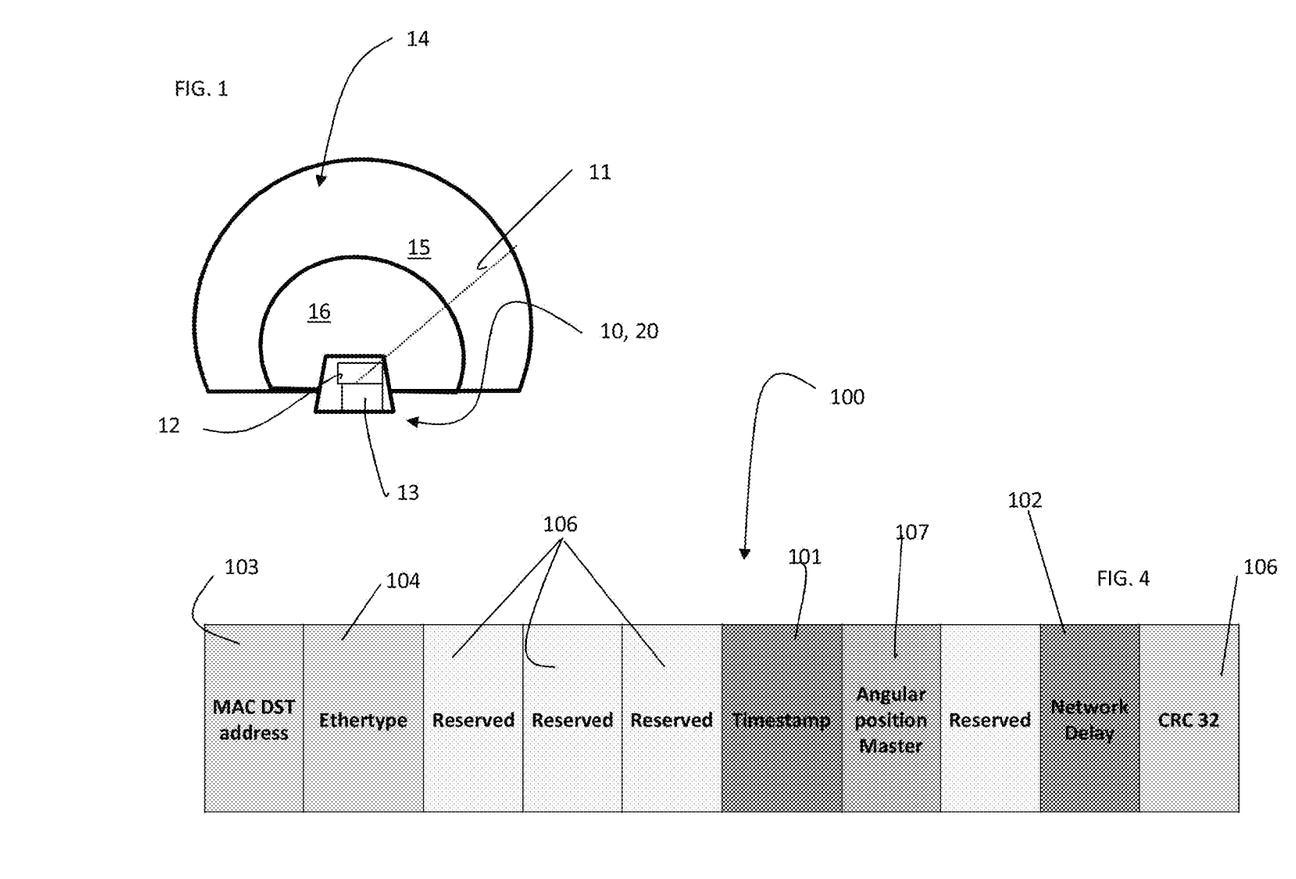
FIG. 1 is a schematic top view of the operating principle of an embodiment of scanning lasers.
FIG. 4 is a synchronization frame according to the protocol used in the communication network of FIG. 3.

With reference now to FIG. 1, each scanning laser, be it master 10 or slave 20, emits a laser beam 11 from a laser source, indicated with the numeral 12. The laser beam 11 is moved by means of an optical system 13 in such a way as to scan a certain portion of space 14. This portion of space has a certain angular dimension centred on the scanning laser. In the example shown, the laser beam 11 is scanned by the optical system 13 for an angle of 180°. However, the shape of the space 14 in which the laser beam 11 is scanned can be the most widely varied. For example, the scan angle can reach 275° or in some cases up to 360°.

Figure 2:
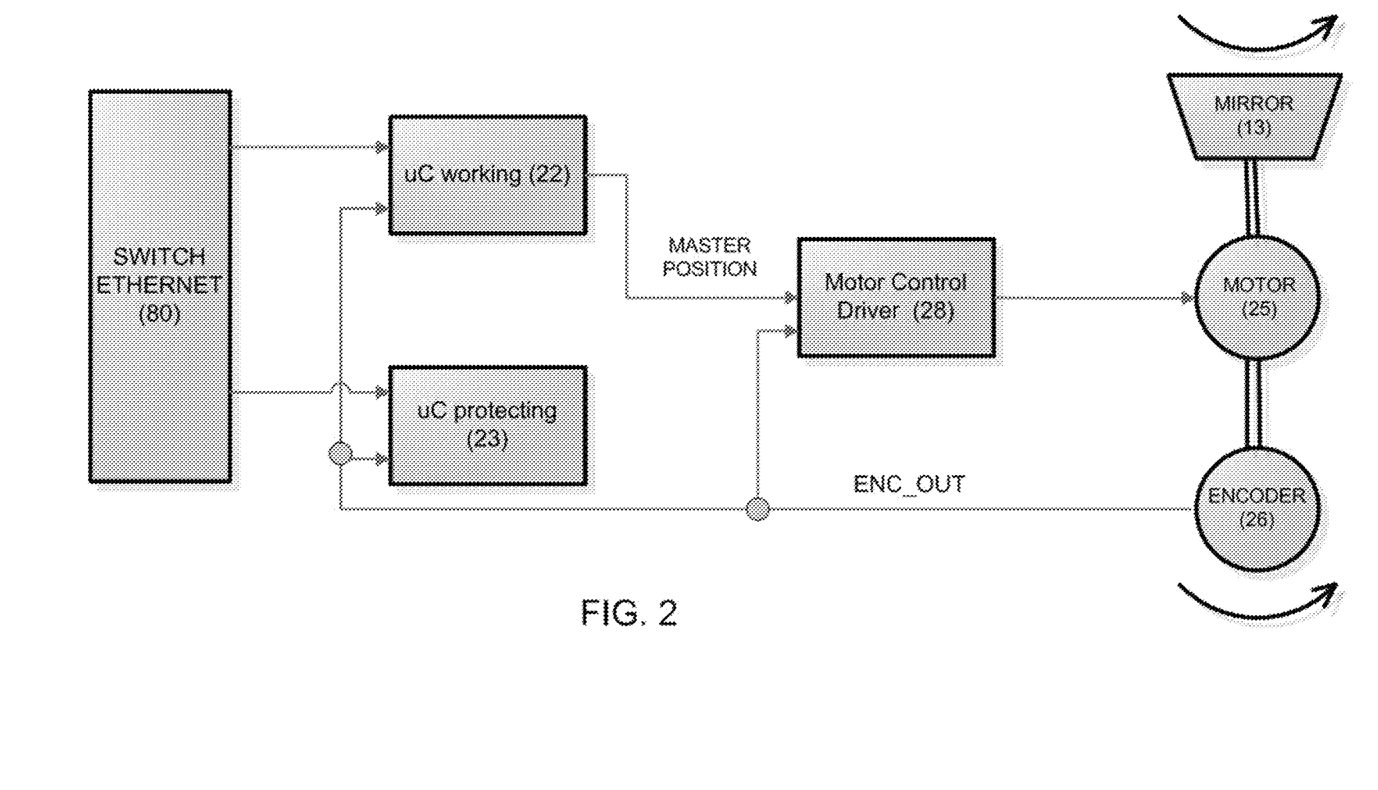
FIG. 2 is a schematic view of a slave scanning laser.

The optical system 13 is actuated by means of a motor 25. The motor 25 in the slave 20 is shown in FIG. 2. The motor 25 is connected to an encoder 26 which generates a signal called "Enc_Out" whose frequency is proportional to the speed of rotation of the motor—Enc_Out can also include the absolute angular position of the motor 25, for example of the rotor that is a part thereof (not shown in the drawings). Furthermore, the motor 25 is directly commanded by a driver 28. If the motor 25 is, for example, a brushless motor, driver 28 controls its switching. Furthermore, the motor 25 is indirectly controlled by a microcontroller 22 that commands it speed, for example changing a voltage of a signal sent to the motor 25. For example, the microcontroller 22 can vary the duty cycle of the voltage sent to the motor 25. The speed of the motor can be modified by the microprocessor 22 on the basis of a position of the master's motor, as detailed below.

The speed of rotation of the motor of the master and of the slaves is preferably the same. This speed is preferably pre-set and programmable. It may be modified.

Furthermore, the offset between the instantaneous position of the motor of the master 10 and the instantaneous position of the motor of the slaves 20, so that there are no interference episodes, i.e. that an object may be illuminated by a laser beam 11 belonging to two scanning lasers (be they master or slave) is also pre-set and programmable.

Laser source 12 and optical system 13 are known in the art and will not be further detailed hereafter.

The portion of space 14, or field of view, can be divided into sub-areas, for example area 15 and area 16, depending on the distance from the scanning laser 10, 20.

The presence of an object in one of the two represented sub-areas 15 or 16 can entail different reactions, i.e. when the presence of an object within one of the areas is detected and this information is communicated to the master scanning laser, depending on the area, the machine to be protected can be blocked or a warning signal can be emitted.

As shown in FIG. 3, the master and slave scanning lasers 10, 20 are in mutual communication through a communication network, for example an Ethernet network 40. The Ethernet network is an internal VLAN that allows communication of messages from the master to the slaves and vice versa through the Ethernet protocol. In the Ethernet communication protocol, messages are called frames.

Furthermore, only the master scanning laser 10 is in communication with additional devices, such as a personal computer 41 or another device in which is preferably present a graphical user interface, also known as GUI, through a second communication network 50, preferably an external VLAN.

The messages according to the Ethernet protocol in the first communication network 40 are preferably sent via cable. A communication interface between master and slave, therefore, an interface that includes, from the physical viewpoint, a cable 60 in which the messages are sent. A switch 70 between master and first slave as well as a switch 80 between each pair of slaves assures a correct addressing of the messages sent via cable 60. Preferably, the switch 70, 80 is an Ethernet switch.

Each scanning laser 10, 20, includes two logic units, for example two microprocessors, to be functional even in a single fault condition. The microprocessors of the master as indicated with the numerals 17 and 18, those of the slaves 22 and 23. The two microprocessors are also called "working" and "protecting" because of their function. As seen above with reference to FIG. 2, the microprocessor 22 of the slave 20 commands its motor 25. In FIG. 2, the two microprocessors 22 and 23 of the slave are shown.

Figure 7:
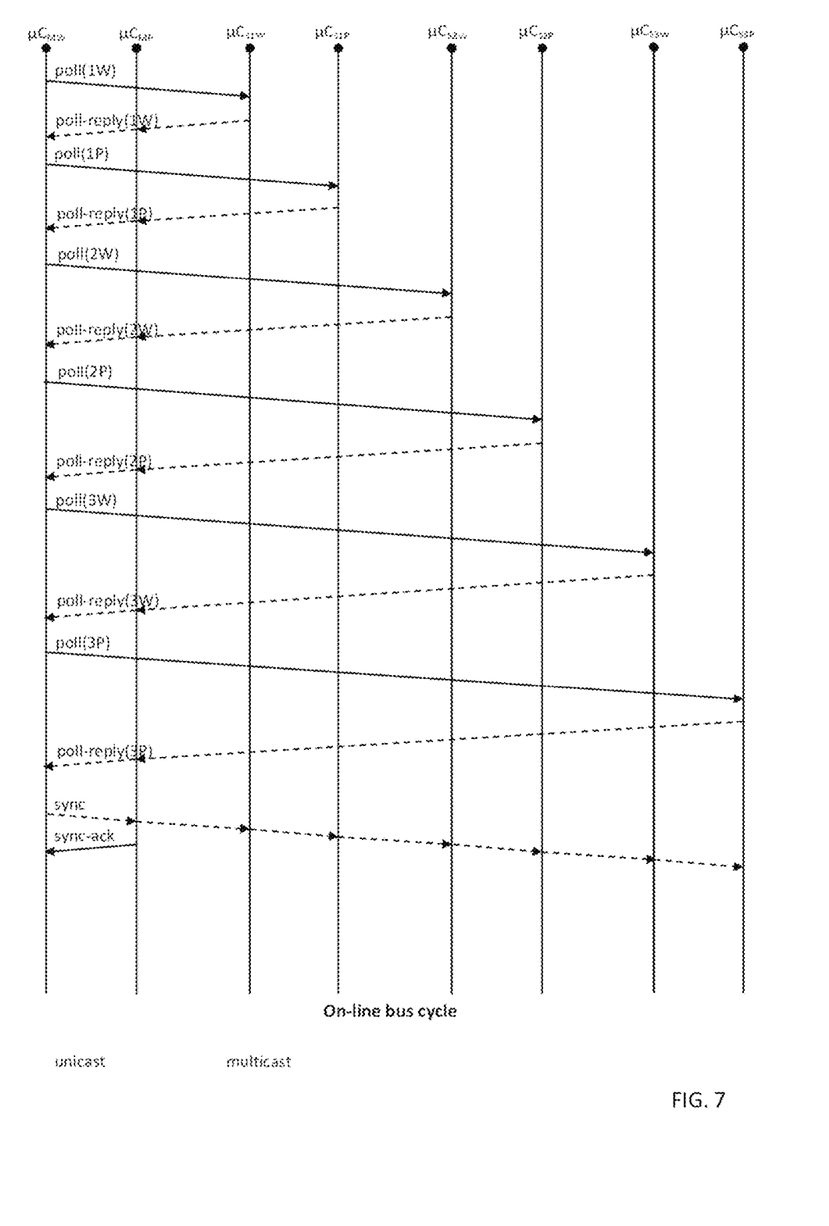
FIG. 7 depicts polling.

The communication between the scanning lasers through the communication network 40 with the Ethernet protocol takes place as shown in FIGS. 6 and 7. At regular intervals, the master 10 sends a polling message to all slaves 20. The polling message is sent by the working microprocessor 17 to all the slave microprocessors, both working and protecting, 22 and 23. If there is a communication from the slave 20 in reply to the polling, the interrogated slave 20 sends a poll-reply, through the network 40 and according to the Ethernet protocol, to the master 10.

In addition to the polling messages and to the consequent replies, a synchronization message, preferably according to the Ethernet protocol, is sent at regular interval by the master scanning laser 10 to the slave scanning lasers 20. The synchronization message serves the purpose of synchronizing the internal clocks (not shown) of the slave 20 with that of the master 10.

A synchronization signal sync (FIG. 6) is sent by the working microprocessor 17 of the master to all microprocessors, both working and protecting 22, 23, of all the slaves.

The sync frame 100 is shown in FIG. 4. The frame includes the timestamp 101 of the master 10, as well as the network delay 102, which are the bits necessary for the synchronization of the clocks of the slaves with that of the master. The synchronization of the clocks is performed in a standard manner, known in the art, preferably according to the Ethernet protocol.

The synchronization frame (sync) 100 preferably includes the recipient of the frame itself (MAC address 103), the specific Ethernet protocol used (Ethertype 104), error control bits (cyclic redundancy check (CRC) 105), etc. Some positions of bits in the frame can be reserved for information to be transmitted known according to the Ethernet protocol (see the reserved positions 106 of FIG. 4).

Furthermore, according to the disclosure, the synchronization frame 100 includes an additional datum 107, in a determined position and including a certain number of bits. This additional datum 107, inserted for example by the microprocessor 17, 18 of the master, includes data relating to the position of the motor of the master. For example it is related to the phase of the motor of the master, for example the position of the optical system 13 of the master in a determined instant identified by a "timestamp."

In this way each slave is aware, as soon as it receives the frame 100 through the network 40, that at the time indicated in the timestamp 101, the position of the motor of the master is the one indicated in the additional datum 107.

This allows a possible adjustment of the speed and phase of the motor 25 of the slave 20 in such a way that the pre-set offset between master and slave is reached and preferably maintained as constant as possible.

The adjustment takes place through two feedback loops, an outer cycle that is carried out with a typical cycle time of 300 milliseconds for the phase (relative motor position between master and slave), and an inner cycle that is carried out with a typical cycle time of 30 milliseconds for the speed of the motor 25.

Figure 5:
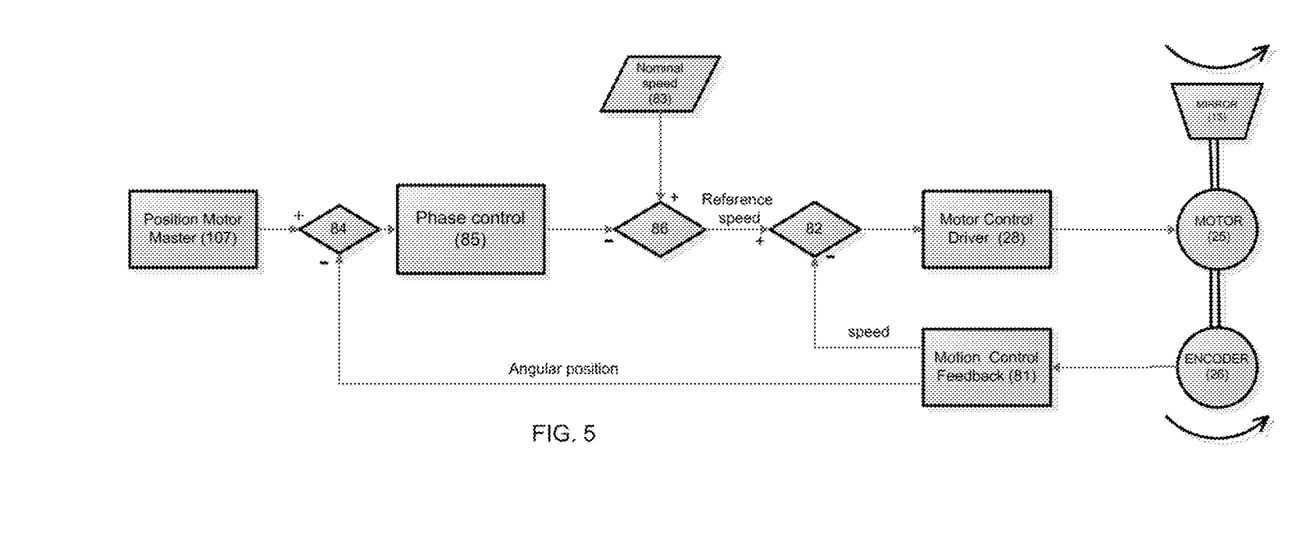
FIG. 5 is an exemplifying diagram of a method for controlling the slave scanning lasers according to the disclosure.

With reference to FIG. 5, the feedback loops operate in the following way.

The phase of the master motor 107 is received by each slave 20 through the frame 100. From the encoder 26 that is connected mechanically to the motor 25 of the slave 20, two items of information are extracted through the control 81. A first item of information is the speed of the motor and a second one is its phase, i.e. for example information of the instant in time in which the rotor of the motor 25 moves to the reference position.

Furthermore, as already seen from FIG. 2, the driver 28 together with the microcontroller 22 are able to modify the average value of the voltage applied to the motor, so as to vary the speed of the motor 25.

The driver 81 modifies the speed of the motor 25 in the way described below.

A comparison is first of all carried out between speeds at the node 82, which represents the point of comparison of the feedback loop of the speed. Such a loop is performed for example every 30 milliseconds. At node 82 the following signals are received: the real speed signal of the motor 25 of the slave 20 from the control 81 and the desired speed signal. This desired speed is a processing of two additional signals processed at the node 86. At the node 86 signals from the blocks 83 and 85 arrive. From the block 83 the "pre-set" speed signal is sent, or the signal of the speed at which the motor 25 should run according to the program. From the block 85 instead arrives a desired value of speed that depends on the position of the motor of the master 10. In other words, the signal coming from 85 takes into account the fact that an incorrect offset exists between the motor of the master and the motor of the slave—as deduced from the message 100 containing the datum 107—and to bring this offset back to the required parameter, the speed of the motor 25 has to be changed. The node 84 instead is the point of comparison of the phase loop that is carried out for example every 300 milliseconds and it functions in this way. At node 84, the signal of real position of the motor of the slave 20 from the control 81 is received along with the signal of position of the motor of the master from the datum 107 of the synchronization message 100. The two values are compared and this comparison is processed within the block 85

(phase control) whose output is a relative speed variation signal, useful to make the desired speed vary so as to minimize the phase error. In other words, in 84 the signals of real position of the motor 25 are received and the value of position of the motor of the master is made known by 100. The two motors should have a pre-set and programmed phase offset. In the block 85, the check is carried out as to whether the position of the master and slave motor is the programmed one, and if not, then a change to be imposed to the speed of the motor 25 is calculated so that the phase offset between master motor and slave motor is brought back to the correct limits.

The output of the block 85, i.e. this change in speed, is sent to the block 86 described above.

Therefore, the speed of the motor 25 is changed by means of the driver 28 so as to bring the phase offset between master motor and slave motor back to within the required limits.

The changes to the speed of the motor 25 with respect to the pre-programmed speed (nominal speed sent by the block 83) are preferably small. Therefore in the node 86 both signals are received, both the change required by the block 85 and the pre-programmed speed of the motor. Hence, once the real speed of the motor 25 is also known by the control 81, the speed of the motor is changed through the driver 28.

What is claimed is:

1. A safety system comprising:
   a master scanning laser including a first laser system adapted to emit a first laser beam and a first optical system adapted to scan the first laser beam within a field of view, the first optical system being driven by a first motor;
   a slave scanning laser including a second laser system adapted to emit a second laser beam and a second optical system adapted to scan the second laser beam within a field of view, the second optical system being driven by a second motor;
   a communication network connecting the master scanning laser and the slave scanning laser, and adapted to support a network protocol wherein messages are sent according to the network protocol, the network protocol including a synchronization message for the clock synchronization of the master scanning laser and the slave scanning laser; and
   the master scanning laser includes a first logic unit adapted to add a first additional datum to the synchronization message, the first additional datum added to the synchronization message being representative of a position of the first motor at a given time corresponding to a time stamp of the synchronization message.

2. The system of claim 1, wherein the scanning lasers are safety scanning lasers.

3. The system of claim 1, wherein the scanning lasers have first and second fields of view, substantially coplanar to each other.

4. The system of claim 1, wherein the master scanning laser and the slave scanning laser are connected via a communication interface including a cable.

5. The system of claim 1, including a second slave scanning laser.

6. The system of claim 5, wherein the master scanning laser and the slave scanning lasers are connected via a communication interface including a cable.

7. The system of claim 1, wherein the network protocol is an Ethernet network protocol.

8. The system of claim 1, wherein the first additional datum relates to a phase of the first motor at a given time.

9. The system of claim 1, wherein the first logic unit is adapted to add a second additional datum to a message of the network protocol, the second additional datum being representative of a speed of the first motor.

10. The system of claim 1, wherein the slave scanning laser includes a second logic unit adapted to change the speed of the second motor based on the first additional datum.

11. The system of claim 1, wherein the master scanning laser is connected via the communication network to the slave scanning laser via a switch.

12. The system of claim 9, wherein the switch is an Ethernet switch.

13. The system of claim 1, wherein the slave scanning laser includes second and third logic units, the synchronization message being sent by the master scanning laser to the first, second and the third logic units.

14. A method for managing a plurality of scanning lasers including at least one master scanning laser and at least one slave scanning laser, wherein:
   the master scanning laser includes a first laser system adapted to emit a first laser beam and a first optical system adapted to scan the first laser beam within a field of view, the first optical system being driven by a first motor;
   the slave scanning laser includes a second laser system adapted to emit a second laser beam and a second optical system adapted to scan the second laser beam within a field of view, the second optical system being driven by a second motor;
   the master scanning laser and the slave scanning laser being connected to each other via a communication network, the communication network being adapted to support a network protocol wherein messages are sent according to the network protocol; and
   the method further comprising sending a synchronization message by the master scanning laser to the slave scanning laser according to the network protocol to synchronize clocks of the master scanning laser and of the slave scanning laser;
   before sending the synchronization message, adding to the synchronization message according to the network protocol a first additional datum including one or more bits relating to the position of the first motor at a given time corresponding to a time stamp of the synchronization message; and
   changing at least one of a relative position or speed of the second motor with respect to that of the first motor based on the first additional datum.

15. The method of claim 14, wherein the plurality of scanning lasers includes at least two slave scanning lasers, and wherein the method includes sending a polling signal by the master scanning laser to the at least two slave scanning lasers according to the network protocol for sending data relating to the presence of objects within the field of view of the at least two slave scanning lasers.

16. The method of claim 14, wherein adding the first additional datum includes adding the first additional datum to all of the synchronization messages according to the network protocol.

17. The method of claim 16, wherein the plurality includes at least two slave scanning lasers and wherein the method includes sending a polling signal by the master scanning laser to the at least two slave scanning lasers according to the network protocol for sending data relating to the presence of objects within the field of view of the at least two slave scanning lasers.

18. The method of claim 14, wherein changing at least one of a relative position or speed of the second motor with respect to that of the first motor based on the first additional datum includes the slave scanning laser estimating a position of the first motor of the master scanning laser at time t1 and determining a desired phase of the second motor at time t1, wherein time t1 is a time instant when the slave scanning laser received the synchronization message.

19. The method of claim 18, wherein the estimated position of the first motor at time t1 is estimated by FM(t1)=FM(t0)+motor speed*(t1−t0), wherein the motor speed is a speed of the first motor, time t0 is a time instant when the master scanning laser sends the synchronization message, and FM(t0) is the position of the first motor when the synchronization message is sent.

20. The method of claim 19, wherein a desired phase of the second motor at time t1 for changing its relative position or speed is determined by FDSN(t1)=FM(t1)+DELTA_N, wherein DELTA_N is a predetermined delay based on a position of the slave scanning laser in physical space.

\* \* \* \* \*